(12) United States Patent
Akiyama

(10) Patent No.: US 11,245,630 B2
(45) Date of Patent: Feb. 8, 2022

(54) NETWORK SYSTEM AND NETWORK BAND CONTROL MANAGEMENT METHOD

(71) Applicant: Nippon Telegraph and Telephone Corporation, Tokyo (JP)

(72) Inventor: Takayuki Akiyama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/734,022

(22) PCT Filed: Jun. 3, 2019

(86) PCT No.: PCT/JP2019/022038
§ 371 (c)(1),
(2) Date: Dec. 1, 2020

(87) PCT Pub. No.: WO2019/235442
PCT Pub. Date: Dec. 12, 2019

(65) Prior Publication Data
US 2021/0234802 A1    Jul. 29, 2021

(30) Foreign Application Priority Data

Jun. 4, 2018 (JP) .............................. JP2018-106838

(51) Int. Cl.
*H04L 12/801* (2013.01)
*H04L 12/46* (2006.01)
*H04L 12/815* (2013.01)
*H04L 12/851* (2013.01)
*H04L 12/931* (2013.01)

(52) U.S. Cl.
CPC .......... *H04L 47/13* (2013.01); *H04L 12/4641* (2013.01); *H04L 47/22* (2013.01); *H04L 47/24* (2013.01); *H04L 49/70* (2013.01)

(58) Field of Classification Search
CPC ..... H04L 47/13; H04L 12/4641; H04L 47/22; H04L 47/24; H04L 47/32; H04L 49/70;
(Continued)

(56) References Cited

U.S. PATENT DOCUMENTS 10,129,117 B2 * 11/2018 Gupta .................... G06F 16/173
10,484,274 B2 * 11/2019 Wang ................... H04L 41/0893
(Continued)

FOREIGN PATENT DOCUMENTS

JP    2015-149577    8/2015

OTHER PUBLICATIONS

Docs.openstack.org, [online], "QoS (Quality of Service)," Feb. 8, 2018, retrieved on Apr. 6, 2018, retrieved from URL<https://docs.openstack.org/ocata/ja/networking-guide/config-qos.html>, 24 pages (with English Translation).
(Continued)

*Primary Examiner* — Wutchung Chu
(74) *Attorney, Agent, or Firm* — Fish & Richardson P.C.

(57) ABSTRACT

Provided are a network system and a network bandwidth control management method capable of preventing packets that need to preferentially flow from being discarded at a time of high load. A network system includes an external switch that is provided between a virtualization platform and an external network and configured to control a bandwidth amount of packets flowing into an open virtual switch, and an network control management device that is configured to modify a configuration of bandwidth control and priority control of the external switch in response to addition or deletion of a service of the virtualization platform based on information acquired from compute nodes, a network node, and a controller node.

8 Claims, 14 Drawing Sheets

(58) Field of Classification Search
CPC ... H04L 12/4645; H04L 47/522; H04L 47/30; H04L 47/60; H04L 47/6215; H04L 47/6275; H04L 49/90; H04L 69/22; H04L 47/2483; H04L 41/0823; H04L 67/34; H04L 41/0806; H04L 29/08981; H04L 45/50; H04L 41/12; H04L 12/462; H04L 45/22; H04L 67/2804; H04L 49/25; H04L 45/12; H04L 49/3063; H04L 45/00; H04L 49/354; H04L 47/12; H04L 45/586; H04L 45/306; H04L 12/66; H04L 43/06; H04L 41/0893; H04L 45/38; H04L 47/10; H04L 67/10; H04L 12/14; H04L 41/0896; H04L 41/046; H04L 41/145; H04L 41/0813; G06F 9/5038; G06F 9/45558; G06F 9/3885; G06F 9/48; G06F 9/45533; G06F 15/17331; H04W 24/02

See application file for complete search history.

(56) References Cited

U.S. PATENT DOCUMENTS

| | | | | |
|---|---|---|---|---|
| 10,536,355 | B1* | 1/2020 | Cao | G06F 3/0683 |
| 2013/0125230 | A1* | 5/2013 | Koponen | G06F 9/45533 726/13 |
| 2014/0226661 | A1* | 8/2014 | Mekkattuparamban | H04L 45/74 370/392 |
| 2015/0100704 | A1* | 4/2015 | Davie | G06F 9/45533 709/238 |
| 2015/0222561 | A1* | 8/2015 | Okuno | H04L 47/30 370/235 |
| 2016/0142474 | A1* | 5/2016 | Itsumi | H04L 12/4625 370/390 |
| 2016/0301631 | A1* | 10/2016 | Yu | H04L 47/2483 |
| 2017/0324671 | A1* | 11/2017 | Zhang | H04L 47/41 |
| 2018/0109471 | A1* | 4/2018 | Chang | H04L 49/253 |
| 2018/0123911 | A1* | 5/2018 | Zhang | H04L 41/5019 |
| 2019/0097931 | A1* | 3/2019 | Atli | H04L 47/12 |
| 2019/0222522 | A1* | 7/2019 | Shih | H04L 49/356 |
| 2020/0336511 | A1* | 10/2020 | Martinez De La Cruz | H04L 63/166 |
| 2020/0382421 | A1* | 12/2020 | K | H04L 43/026 |

OTHER PUBLICATIONS

Docs.openvswitch.org, [online], "Quality of Service (QoS)," 2016, retrieved on Apr. 6, 2018, retrieved from URL<https://docs.openvswitch.org/en/latest/faq/qos/>, 4 pages.

* cited by examiner

| DATE AND TIME | USAGE BANDWIDTH AMOUNT OF SERVICE A | USAGE BANDWIDTH AMOUNT OF SERVICE B | USAGE BANDWIDTH AMOUNT OF SERVICE C |
|---|---|---|---|
| | | | |
| | | | |
| | | | |

Fig. 3A

| ID | IP ADDRESS | MAC ADDRESS | VLAN ID | UPPER LIMIT BANDWIDTH | ALLOCATED BANDWIDTH |
|---|---|---|---|---|---|
| | | | | | |
| | | | | | |
| | | | | | |

Fig. 3 B

NETWORK SYSTEM AND NETWORK BAND CONTROL MANAGEMENT METHOD

CROSS-REFERENCE TO RELATED APPLICATIONS

This application is a National Stage application under 35 U.S.C. § 371 of International Application No. PCT/JP2019/022038, having an International Filing Date of Jun. 3, 2019, which claims priority to Japanese Application Serial No. 2018-106838, filed on Jun. 4, 2018. The disclosure of the prior application is considered part of the disclosure of this application, and is incorporated in its entirety into this application.

TECHNICAL FIELD

The present invention relates to a network system and a network bandwidth control management method.

BACKGROUND ART

It is important for network operators to effectively utilize resources of the entire network to maintain transfer quality and reduce network costs. A network virtualization technique has been proposed as a technique for flexibly handling sudden and irregular changes of the network, which will realize diversification of services in the related art and the effective utilization of the network resources.

A technique for realizing virtual machines (hereinafter, referred to as virtual machines VM), which are a plurality of virtual computers on a single physical server, by software called a hypervisor has been known. The virtual machines VM can independently operate an operating system. The physical server on which the plurality of virtual machines VM operates is a computer such as a workstation or a personal computer. In an environment in which a plurality of virtual machine servers is connected via a network, the virtual machines VM realized on the virtual machine server can also communicate via the network.

OpenStack is a software group for constructing a cloud environment developed by an open source project. In the OpenStack, a cloud environment that provides resources of the lowest layer such as virtual machines, storages, and networks can be constructed. The types of the quality of service (QoS) rules of the OpenStack includes a bandwidth limit, a minimum bandwidth, and packet priority (DSCP: Differentiated Services Code Point), and the bandwidth can be limited (see Non Patent Literature 1). The QoS is a function of guaranteeing a certain type of network requirement such as a bandwidth, a delay, a jitter, or reliability, and is used to meet a service-level agreement (SLA) between application providers and users. Network devices such as switches and routers can achieve the QoS condition agreed in the SLA by giving priority marks to traffics.

The QoS of an open virtual switch (OVS) commonly utilized in the OpenStack supports shaping for an output (egress) and policing for an input (ingress) (see Non Patent Literature 2).

The policing is performed on the input of the OVS, and when an upper limit of the bandwidth is configured for each service and the bandwidth exceeds the configured value, the packet is discarded. The upper limit of the bandwidth is configured for each service, and when operation management as a system is necessary, the operator needs to design the network and modify the configured value in consideration of other services and the throughput of the OVS.

However, in a virtualization environment, the service is frequently added or deleted, and thus, a redesign work of the network becomes cumbersome.

When a certain service is used up to the bandwidth upper limit in a state in which the traffic of the NW is low in the entire virtualization platform, the service can use the bandwidth up to the configured upper limit. It is necessary to temporarily modify the bandwidth upper limit in order to effectively utilize the NW, but it is necessary for a maintenance party to perform a manual operation.

Hereinafter, network bandwidth control in a virtualization platform of the related art will be described.

FIGS. 15 and 16 are diagrams for illustrating the network bandwidth control in the virtualization platform of the related art.

As illustrated in FIGS. 15 and 16, a network system according to the related art includes a virtual machine $VM_1$ that provides, in a physical server, a service A, a virtual machine $VM_2$ that provides a service B, a virtual machine $VM_3$ that provides a service C, a virtual machine $VM_4$, and compute nodes 1 to 3, a network node 6, and a controller node 7 which are components constituting OpenStack, and an L2 switch L2SW (hereinafter, referred to as L2SW) 4.

The virtual machine VM1 to the virtual machine VM4 are connected to an external network NW8 via the network node 6.

The virtual servers VM1 to VM4 are virtual information processing devices that are realized by software. The virtual servers VM1 to VM4 are connected to the L2SW 4 via a virtual switch (not illustrated). The L2SW 4 is hardware for switching communications of the virtual servers $VM_1$ to VM4, which include their own virtual switch, in the physical server. The L2SW as the hardware is required to connect the plurality of computes, and this device serves as the L2SW 4.

The OpenStack utilizes nodes (physical or virtual servers) for each role. In FIG. 15, the OpenStack is divided into the compute nodes 1 to 3, the network node 6, and the controller node 7.

The compute nodes 1 to 3 perform the construction and control of the virtualization platform. The compute node 1 is a node on which the virtual machine $VM_1$ operates, the compute node 2 is a node on which the virtual machine $VM_2$ and the virtual machine VM3 operate, and the compute node 3 is a node on which the virtual machine $VM_4$ operates.

The network node 6 performs virtualization and management of the network. The network node 6 is a server that provides network services for instances such as an Internet Protocol (IP) transfer and Dynamic Host Configuration Protocol (DHCP). The network node 6 provides functions such as virtual router and DHCP by the compute nodes 1 to 3. The network node 6 includes the OVS 5.

In the OpenStack, an upper limit of the bandwidth can be configured for each service. When the bandwidth exceeds the upper limit of the bandwidth, the OVS 5 discards the packet by policing on input.

The controller node 7 places, among the components, a component for control of all the services of the management system. The controller node 7 is a management server that processes requests from a user or other nodes and manages the entire OpenStack. The controller node 7 can configure an upper limit of the bandwidth of only the network node 6.

In the example of FIG. 15, the bandwidth upper limits are configured to 4 Gbps, 3 Gbps, and 2 Gbps for a service A (priority: high), a service B (priority: low), and a service C (priority: low).

For example, as indicated by reference symbol a of FIG. 15, when a bandwidth of 3 Gbps is input to the service C, the packets for 2 Gbps pass by policing control, and the remaining packets for 1 Gbps are discarded (see, reference symbol b of FIG. 15).

The policing is to discard the packet when the service exceeds the upper limit bandwidth regardless of the traffic volume of the entire NW of the virtualization platform. Thus, when the traffic volume of the entire NW of the virtualization platform is low and a certain service exceeds the bandwidth upper limit, there is room in the NW, but the packet may be discarded due to the configured upper limit. That is, the packets of which the bandwidth exceeds the bandwidth upper limit are discarded by the policing in which the bandwidth upper limit is configured.

On the other hand, when each service does not exceed the bandwidth upper limit, the input packets flow into the OVS 5 without performing the policing. However, when the total traffic of all services (hereinafter, referred to as "total traffic volume") exceeds the throughput limit of the OVS 5, the packets are discarded without distinguishing the priority of the packet, and thus, service interruption or delay of the virtualization platform occurs.

For example, when the throughput of the OVS 5 illustrated in FIG. 16 is only 8 Gbps, the input packet may amount to 9 Gbps, the sum of 4 Gbps, 3 Gbps, and 2 Gbps.

Thus, the OVS 5 discards the packets for 1 Gbps in volume, but discards the packets for the service A with high priority similarly to the services B and C with low priority (see, reference symbol c of FIG. 4). That is, the OVS 5 discards the packets without considering the priority in a case where OVS throughput is smaller than the total traffic volume.

CITATION LIST

Non Patent Literature

Non Patent Literature: https://docs.openstack.org/ocata/ja/networking-guide/config-qos.html
Non Patent Literature 2: https://docs.openvswitch.org/en/latest/faq/qos/

SUMMARY OF THE INVENTION

Technical Problem

In the OpenStack, a plurality of services is installed on the virtualization platform, and is connected to the OVS 5. In the QoS of the OpenStack, the upper limit of the bandwidth is configured for each service. Thus, when each service exceeds the upper limit, the packets are discarded, and when each service does not exceed the upper limit, the policing does not work. In particular, when a large number of packets are flowing from the external SW, from the perspective of the entire NW of the virtualization platform, the packets of the individual service, for which the bandwidth does not exceed, flow into the OVS 5, increasing a processing load of the OVS 5, and creating a congestion. That is, the packet loss occurs even though each service is equal to or less than the configured upper limit of the bandwidth. The OVS 5 performs policing in which the packets do not enter a queue. Thus, the packets are discarded even if the packets that needs to be prioritized flow form the external NW. This causes delay due to communication interruption or packet retransmission of the service installed on the virtualization platform occurs. For example, even with a service with high priority such as phone calls, the packet may be discarded, and thus, the service may not be established.

One of countermeasures to such occurrence is a manual configuration method of providing external L2SW or L3SW between the virtualization platform such as OpenStack and the external NW and manually configuring bandwidth control in advance. However, in this manual configuration method, the operator needs to make a design in consideration of the bandwidths of all the services. In this manual configuration method, the operator needs to review the design and perform reconfiguration whenever the service is added or deleted.

The present invention has been made in view of such a background, and an object of the present invention is to provide a network system and a network bandwidth control management method capable of preventing packets that need to preferentially flow at a high load from being discarded.

Means for Solving the Problem

In order to solve the aforementioned problems, in accordance with the invention according to claim 1, there is provided a network system, in which a plurality of services are installed on a virtualization platform and a component constituting OpenStack connected to an open virtual switch (OVS) is included, the OVS being configured to discard packets when the packets flowing from an external NW exceed an upper limit of a bandwidth configured for each service. The network system includes an external SW that is provided between the virtualization platform and the external NW, and configured to control a bandwidth of packets flowing to the OVS, and an NW control management device configured to modify a configuration of bandwidth control and priority control of the external SW in response to addition or deletion of the service of the virtualization platform based on information acquired from the component.

In accordance with the invention according to claim 3, in the network system according to claim 1, the NW control management device includes a data management unit configured to acquire information on a VM from a controller node constituting the component, and to manage information regarding NW control including an ID, an IP address, a MAC address, a VLAN, and a bandwidth of each service: an NW control unit configured to collect information from a ceilometer provided on the virtualization platform, to monitor an NW bandwidth amount of the external SW, and to release or configure a bandwidth limit corresponding to a usage amount of each VM when the upper limit of the bandwidth is not configured or when there is an available bandwidth; and an external SW configuration unit that is configured to generate configuration information for configuring a bandwidth amount to be allocated to each service on the external SW, and is configured to be connected to the external SW to input the configuration information.

In accordance with the invention according to claim 6, there is provided a network bandwidth control management method, in which a plurality of services are installed on a virtualization platform and a component constituting OpenStack connected to an open virtual switch (OVS) is included, the OVS being configured to perform policing of packets when the packets flowing from an external NW exceed an upper limit of a bandwidth configured for each service, the network bandwidth control management method including: changing a configuration of bandwidth control and priority control of an external SW in response to addition or deletion of the service of the virtualization platform based on information acquired from the component in an NW control management device that controls NW control, and controlling a bandwidth amount of the packets flowing into the OVS in the external SW provided between the virtualization platform and the external NW.

Thus, the congestion in the OVS on the virtualization platform can be eliminated, and the packets to be prioritized can be processed. It is possible to prevent the packets that need to preferentially flow from being discarded at a time of high load.

In accordance with the invention according to claim 2, in the network system according to claim 1, the NW control management device is configured to generate configuration information for configuring information regarding an NW including a VLAN, an upper limit bandwidth, and priority which are related to the service on the external SW, based on the acquired information, and the NW control management device is configure to be connected to the external SW, and to modify the configuration of the external SW according to the generated configuration information.

Thus, the NW control management device can modify the configuration of the bandwidth control and the priority control in accordance with the external SW.

In accordance with the invention according to claim 4, in the network system according to claim 1, the NW control management device includes a data storage unit configured to identify a bandwidth amount that is processable by the OVS of the virtualization platform, and to store an upper limit of the bandwidth amount, the NW control management device is configured to collect information from a ceilometer provided on the virtualization platform, to monitor an NW bandwidth amount of the external SW, and to acquire traffic information of each service periodically, and the NW control management device is configured to generate configuration information such that a bandwidth is secured for a service with high priority and an upper limit bandwidth is reduced for a service with low priority before each service does not exceed an upper limit bandwidth configured for each service and an upper limit of a throughput of the OVS is exceeded.

Thus, the status of the NW usage of the virtualization platform is monitored, and the bandwidth control can be automatically modified in response to the service available up to the bandwidth upper limit and an status of the NW availability of the virtualization platform. Accordingly, the NW of the virtualization platform can be effectively utilized. In particular, the packets can flow into the virtualization platform from the service with high priority in the external NW, and the service interruption of the service with high priority can be avoided.

In accordance with the invention according to claim 5, the network system according to claim 4, the NW control management device is configured to identify a time, month, day, or day of the week when a traffic volume of each service is the greatest or is small, and the NW control management device is configured to create configuration information to temporarily increase the upper limit bandwidth of the service when the service tends to exceed the upper limit bandwidth and there is room in the NW bandwidth of the entire virtualization platform.

Thus, the function of automatic modification of the bandwidth upper limit of the bandwidth control of the virtualization platform and the external SW 20 temporarily is provided, and the NW of the virtualization platform can be effectively utilized.

Effects of the Invention

According to the present invention, it is possible to provide the network system and the network bandwidth control management method capable of preventing the packets that need to preferentially flow at a high load from being discarded.

BRIEF DESCRIPTION OF DRAWINGS

FIG. 3A is a diagram illustrating an example of records of a DB that stores a usage bandwidth amount at each date and time for each service of the network system according to the present embodiment.

FIG. 3B is a diagram illustrating an example of records of a DB that stores information regarding NW control such as an ID, an IP address, a MAC address, a VLAN, and a bandwidth of each service of the network system according to the present embodiment.

DESCRIPTION OF EMBODIMENTS

Hereinafter, a network system and the like in a mode for implementing the present invention (hereinafter referred to as the "embodiment of the present invention") will be described with reference to the drawings.

Embodiment

Configuration of Network System 100

Figure 1:
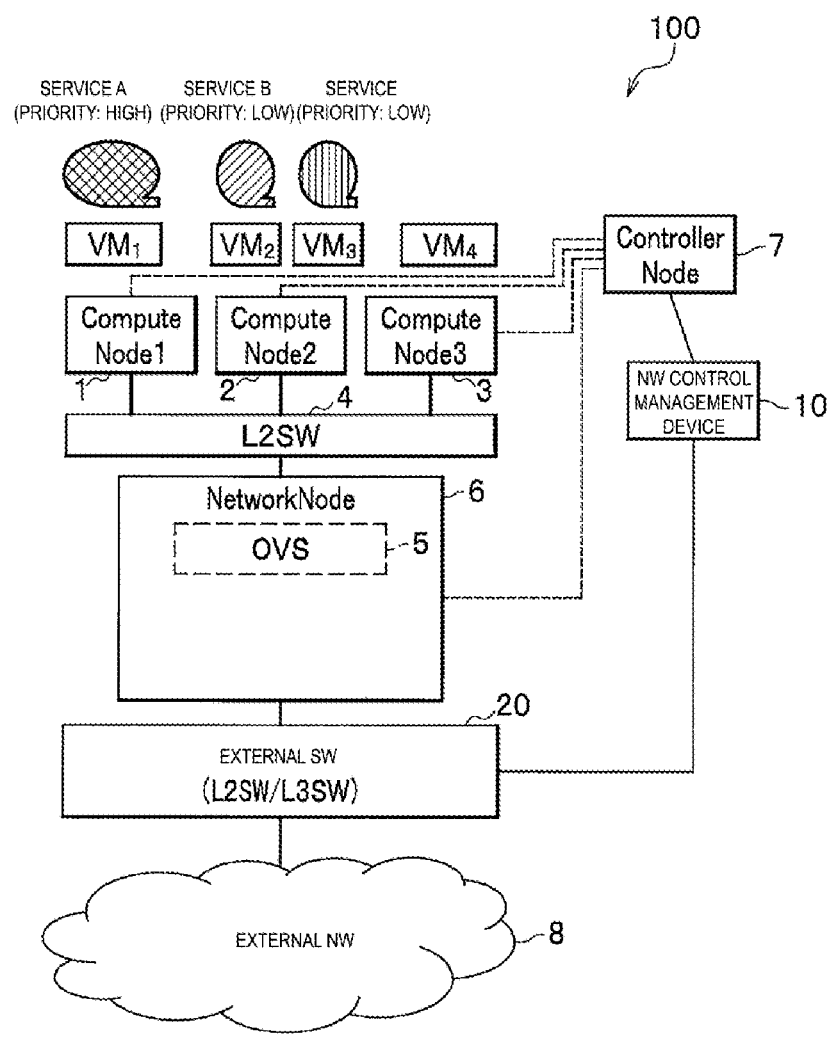
FIG. 1 is a diagram illustrating a configuration example of a network system according to an embodiment of the present invention.
Figure 15:
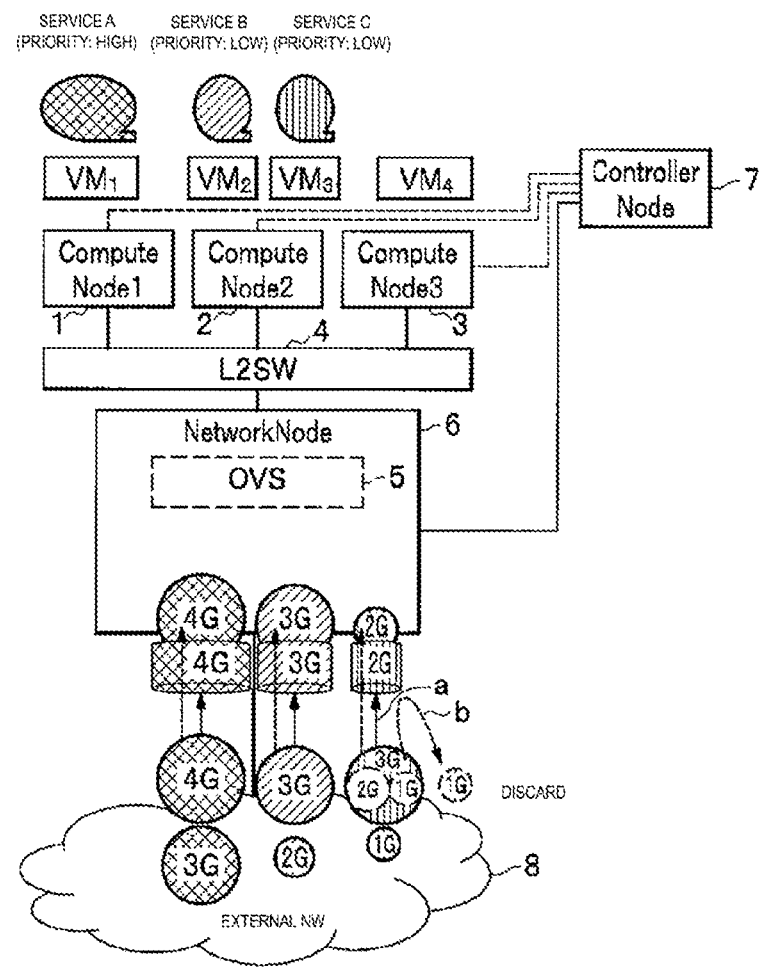
FIG. 15 is a diagram for describing network bandwidth control in a virtualization platform of the related art.

FIG. 1 is a diagram illustrating a configuration example of a network system according to an embodiment of the present invention. FIG. 1 illustrates an initial state of an example operation of the network system. The identical components as those in FIG. 15 are denoted by the identical reference signs.

As illustrated in FIG. 1, the network system 100 includes a virtual machine VM2 that provides, in a physical server, a service B providing a service A, a virtual machine $VM_3$ that provides a service C, a virtual machine VM4, and compute nodes 1 to 3, a network node 6, a controller node 7, and an L2SW 4 that constitute OpenStack which has a plurality of services installed on a virtualization platform and is connected to an OVS 5.

The network system 100 includes an NW control management device 10 that is configured to modify a configuration of bandwidth control and priority control of an external SW 20 in response to addition or deletion of the service of the virtualization platform based on information acquired from the compute nodes 1 to 3, the network node 6, and the controller node 7, and an external SW 20 that is provided between the virtualization platform and an external NW 20 and configured to control the bandwidth amount of the packets flowing into the OVS 5.

The virtual machine $VM_1$ to the virtual machine $VM_4$ are connected to the external NW 8 via the network node 6.

The virtual servers $VM_1$ to VM4 are virtual information processing devices that are realized by software. The virtual servers VM1 to $VM_4$ are connected to the L2SW 4 via a virtual switch (not illustrated). The L2SW 4 is hardware for switching communications of the virtual servers $VM_1$ to $VM_4$, which include their own virtual switch, in the physical server.

The OpenStack utilizes a node (physical or virtual servers) for each role. In FIG. 1, the OpenStack is divided into the compute nodes 1 to 3, the network node 6, and the controller node 7.

The compute nodes 1 to 3 perform the construction and control of the virtualization platform. The compute node 1 is a node on which the virtual machine $VM_1$ operates, the compute node 2 is a node on which the virtual machine $VM_2$ and the virtual machine $VM_3$ operate, and the compute node 3 is a node on which the virtual machine $VM_4$ operates.

The network node 6 performs virtualization and management of the network. The network node 6 is a server that provides network services for instances such as IP transfer and DHCP. The network node 6 provides functions such as virtual router and DHCP by the compute nodes 1 to 3. The network node 6 includes the OVS 5.

In the OpenStack, an upper limit of the bandwidth can be configured for each service. When the bandwidth exceeds the upper limit of the bandwidth, the OVS 5 discards the packet by policing on input.

The controller node 7 places, among the components, a component for control of all the services of the management system. The controller node 7 is a management server that processes requests from a user or other nodes and manages the entire OpenStack. The controller node 7 can configure an upper limit of the bandwidth of only the network node 6.

When the packet that flows from the external NW 20 exceeds the upper limit of the bandwidth configured for each service, the OVS 5 performs policing of the packet.

NW Control Management Device 10

The NW control management device 10 is configured to generate Config information (configuration information) for configuring information regarding the NW including a virtual LAN (VLAN), an upper limit bandwidth, and priority which are related to the services for the external SW 20 based on the information acquired from the compute nodes 1 to 3, the network node 6, and the controller node 7. In addition, the NW control management device 10 is configured to be connected to the external SW 20, and modifies the configuration of the external SW 20 according to the generated Config information.

The NW control management device 10 includes a data management storage unit 114 (see FIG. 2) configured to identify the bandwidth amount that is processable by the OVS 5 of the virtualization platform and to store an upper limit the bandwidth amount. The NW control management device 10 is configured to collect information from a ceilometer provided on the virtualization platform, to monitor the NW bandwidth amount of the external SW 20, and to acquire traffic information of each service periodically. The NW control management device 10 is configured to generate Config information such that the bandwidth is secured for a service with high priority and the bandwidth is reduced for a service with low priority before each service does not exceed an upper limit of the bandwidth configured for each service and exceeds an upper limit of throughput of the OVS 5.

The NW control management device 10 is configured to identify the trends of time, month, day, or day of the week when a traffic volume of each service is the greatest or is small, and to create the Config information that temporarily modifies the upper limit bandwidth of the service when the service tends to exceed the upper limit bandwidth and there is room in the NW bandwidth of the overall virtualization platform.

The NW control management device 10 is configured to monitor a usage situation of the NW of the virtualization platform, and to modify the bandwidth upper limit of the bandwidth control of the virtualization platform and the external SW 20 temporarily in consideration of services available to the bandwidth upper limit and an available situation of the NW of the virtualization platform.

The NW control management device 10 has the following functions (1) to (3).

(1) The NW control management device 10 is configured to manage data information of each service managed by the controller node 7. The data information of each service includes, for example, the following information.

VM_ID

VLAN_ID, MAC address (in case of L2)

IP address, subnet (in case of L3)

upper limit bandwidth (2) The NW control management device 10 has a function of collecting information from the network node 6 by the ceilometer and the like, and has a function of collecting and controlling NW information collected in the external SW 20. The functions of collecting and controlling the NW include, for example, the following functions.

traffic volume of each service periodically collected traffic volume of each current service modify control of upper limit bandwidth corresponding to bandwidth variation.

(3) The NW control management device 10 has a function of configuring the external SW 20. The function of configuring the external SW 20 includes, for example, the following functions.

generating the Config information of the external SW 20 based on the configuration information of (1) in response to the addition or removal of the service generating the Config information for temporarily rewriting the configuration information from the periodic traffic volume of (2) and the current traffic volume in consideration of the bandwidth variation connecting to the external SW 20 and inputting the Config information External SW 20

The external SW 20 is provided between the virtualization platform and the external NW 20 and is configured to control the bandwidth amount of the packet flowing into the OVS 5. The external SW 20 has reachability operable by the NW control management device 10.

Detailed Configuration of NW Control Management Device 10

Figure 2:
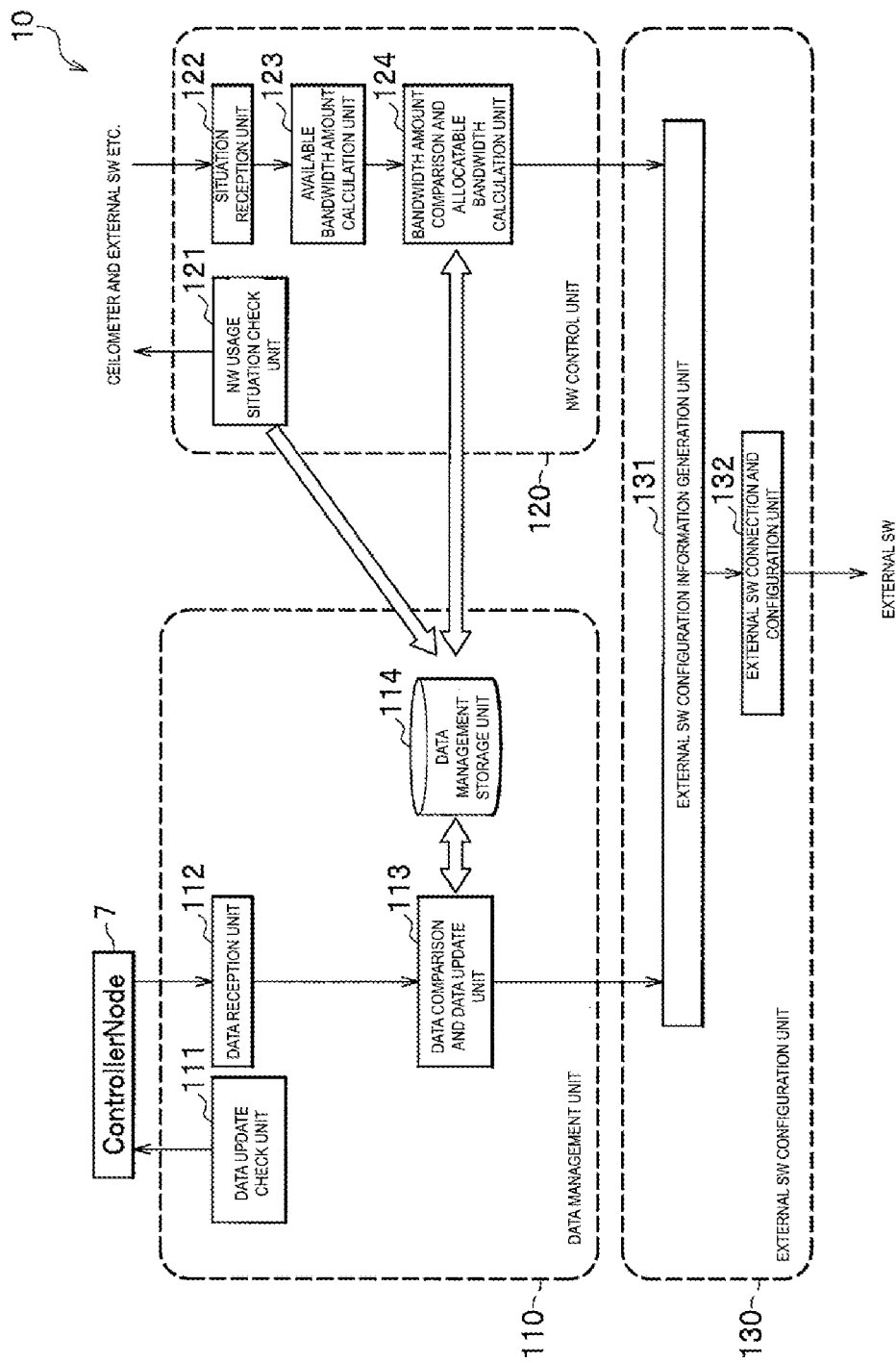
FIG. 2 is a functional block diagram illustrating a detailed configuration of an NW control management device of the network system according to the present embodiment.

FIG. 2 is a functional block diagram illustrating a detailed configuration of the NW control management device 10.

As illustrated in FIG. 2, the NW control management device 10 includes a data management unit 110 configured to acquire information on the VM from the controller node 7 and to manage information regarding the NW control including an ID, an IP address, a MAC address, a VLAN, and a bandwidth of each service: an NW control unit 120 configured to collect information from the ceilometer provided on the virtualization platform, to monitor the NW bandwidth amount of the external SW 20, and to release or configure the bandwidth limitation corresponding to the usage amount of each VM when the upper limit of the bandwidth is not configured or when there is the available bandwidth; and an external SW configuration unit 130 that is configured to generate Config information for configuring the bandwidth amount to be allocated to each service on the external SW 20, and is configured to be connected to the external SW 20 to input Config information.

Data Management Unit 110

The data management unit 110 is configured to manage the information on the VM generated in a virtualization environment from the controller node 7 of the OpenStack.

The data management unit 110 includes a data update check unit 111, a data reception unit 112, a data comparison and data update unit 113, and the data management storage unit 114.

The data update check unit 111 is configured to check the controller node 7 periodically for whether the VM information is updated.

The data reception unit 112 is configured to receive data acquired from the controller node 7.

The data comparison and data update unit 113 is configured to compare information on the received data with the data management information. When there is a modification, the information is transferred to the external SW 20 configuration, and data management is updated.

The data management storage unit 114 is configured to store a throughput value of the OVS 5.

The data management storage unit 114 is configured to store the usage bandwidth amount at each date and time for each service (see FIG. 3A). The data management storage unit 114 is configured to store information regarding the NW control such as the ID, the IP address, the MAC address, the VLAN, and the bandwidth of each service (see FIG. 3A).

NW Control Unit 120

The NW control unit 120 is configured to monitor the NW bandwidth amount of the ceilometer, the external SW 20 or the like, when the upper limit of the bandwidth is not configured or there is the available bandwidth. And the NW control unit 120 is configured to release or configure the bandwidth limitation corresponding to the usage of each VM.

The NW control unit 120 includes an NW usage situation check unit 121, a situation reception unit 122, an available bandwidth amount calculation unit 123, and a bandwidth amount comparison and allocatable bandwidth calculation unit 124.

The NW usage situation check unit 121 is configured to check, to a function of managing the NW bandwidth of the ceilometer, the external SW 20 or the like, the usage situation of the NW bandwidth periodically.

The situation reception unit 122 is configured to receive a situation acquired from the function of managing the NW bandwidth of the ceilometer or the like.

The available bandwidth amount calculation unit 123 is configured to calculate the available bandwidth amount from the acquired usage bandwidth amount.

The bandwidth amount comparison and allocatable bandwidth calculation unit 124 is configured to compare the bandwidth information and the available bandwidth of the data management. The bandwidth amount to be allocated to each service is decided, the information is transferred to the external SW 20, and the data management is updated.

External SW Configuration Unit 130

The external SW configuration unit 130 is configured to access the external SW 20, and to perform the config configuration based on the data management information.

The external SW configuration unit 130 includes an external SW configuration information generation unit 131 and an external SW connection and configuration unit 132.

The external SW configuration information generation unit 131 is configured to generate Config for configuring the allocated bandwidth amount for the external SW 20.

The external SW connection and configuration unit 132 is configured to be connected to the external SW 20 to perform the Config input.

FIGS. 3A and 3B illustrate examples of information to be stored in a database (DB) by the data management storage unit 114. FIG. 3A illustrates an example of records of the DB that stores the usage bandwidth amount at each date and time for each service, and FIG. 3B illustrates an example of records of the information regarding the NW control such as the ID, the IP address, the MAC address, the VLAN, and the bandwidth of each service.

As illustrated in FIG. 3A, the data management storage unit 114 is configured to store the usage bandwidth amount at each date and time for each service in the DB.

As illustrated in FIG. 3B, the data management storage unit 114 is configured to store the ID, the IP address, the MAC address, the VLAN ID, the upper limit bandwidth, and the allocated bandwidth of each service in the DB.

Hereinafter, a network bandwidth control management method of the network system having the aforementioned configuration will be described.

Figure 4:
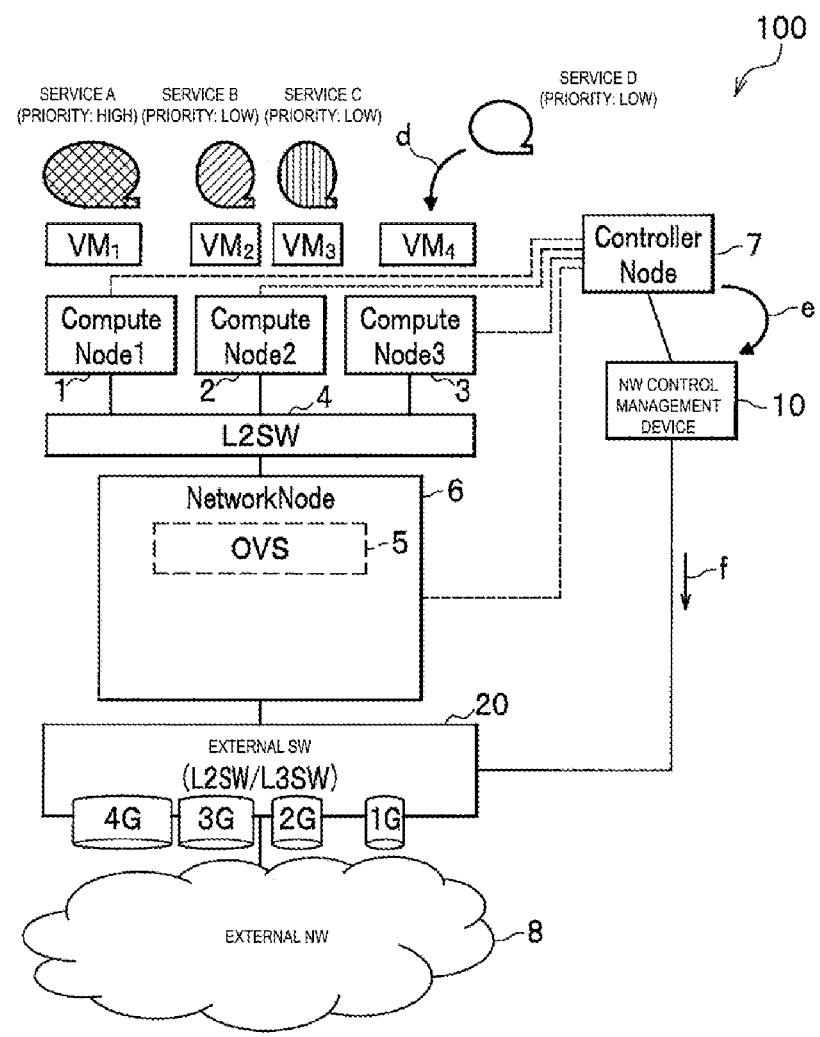
FIG. 4 is a diagram illustrating an operational example of the network system according to the present embodiment in the case of service registration.

Operational example of case of service registration FIG. 4 is a diagram illustrating an operational example in a case of service registration.

As illustrated in FIG. 4, the NW control management device 10 gives priority to the service and registers the service when the service is registered on the virtualization platform. In the example of FIG. 4, the bandwidth upper limits are configured to 4 Gbps, 3 Gbps, and 2 Gbps for a service A (priority: high), a service B (priority: low), and a service C (priority: low), respectively. At this time, the NW control management device 10 registers a service D (priority: high) (see, reference symbol d of FIG. 4).

Specifically, the NW control management device 10 (see FIG. 2) executes the following steps.

Step S1: Information Collection from Controller Node 7

The data update check unit 111 (see FIG. 2) of the data management unit 110 checks the controller node 7 periodically for whether the VM information is not updated. The data reception unit 112 (see FIG. 2) receives the data acquired from the controller node 7 (see, reference symbol e of FIG. 4).

Step S2: Storage of Information in DB

The data comparison and data update unit 113 (see FIG. 2) acquires information on the service, which has been registered and managed in the controller node 7, in response to the registration of the service, and stores the acquired information and information on the priority in the DB of the data management storage unit 114 (see FIG. 2).

Step S3: Generation of Config Information

The data comparison and data update unit 113 refers to the DB of the data management storage unit 114, and generates Config information for configuring the External SW 20 from the acquired data based on the information regarding the NW such as the VLAN, the upper limit bandwidth, and the priority which are related to the service in the NW control management device 10. At this time, the data comparison and data update unit 113 configures an output of the external SW 20 so as not to exceed the throughput of the OVS.

Step S4: Config Input

The external SW configuration information generation unit 131 (see FIG. 2) of the external SW configuration unit 130 configures the configuration information of the external SW 20 based on the generated Config information.

Step S5: Configuration Modification

The external SW connection and configuration unit 132 (see FIG. 2) of the external SW configuration unit 130 is connected to the external SW 20 to perform the Config input (see, reference symbol f of FIG. 4).

Step S6: Configuration Add

As illustrated in FIG. 4, the service D (priority: high) is configured and added at a bandwidth upper limit of 1 Gbps.

Operational Example 1 in Operation

Figure 5:
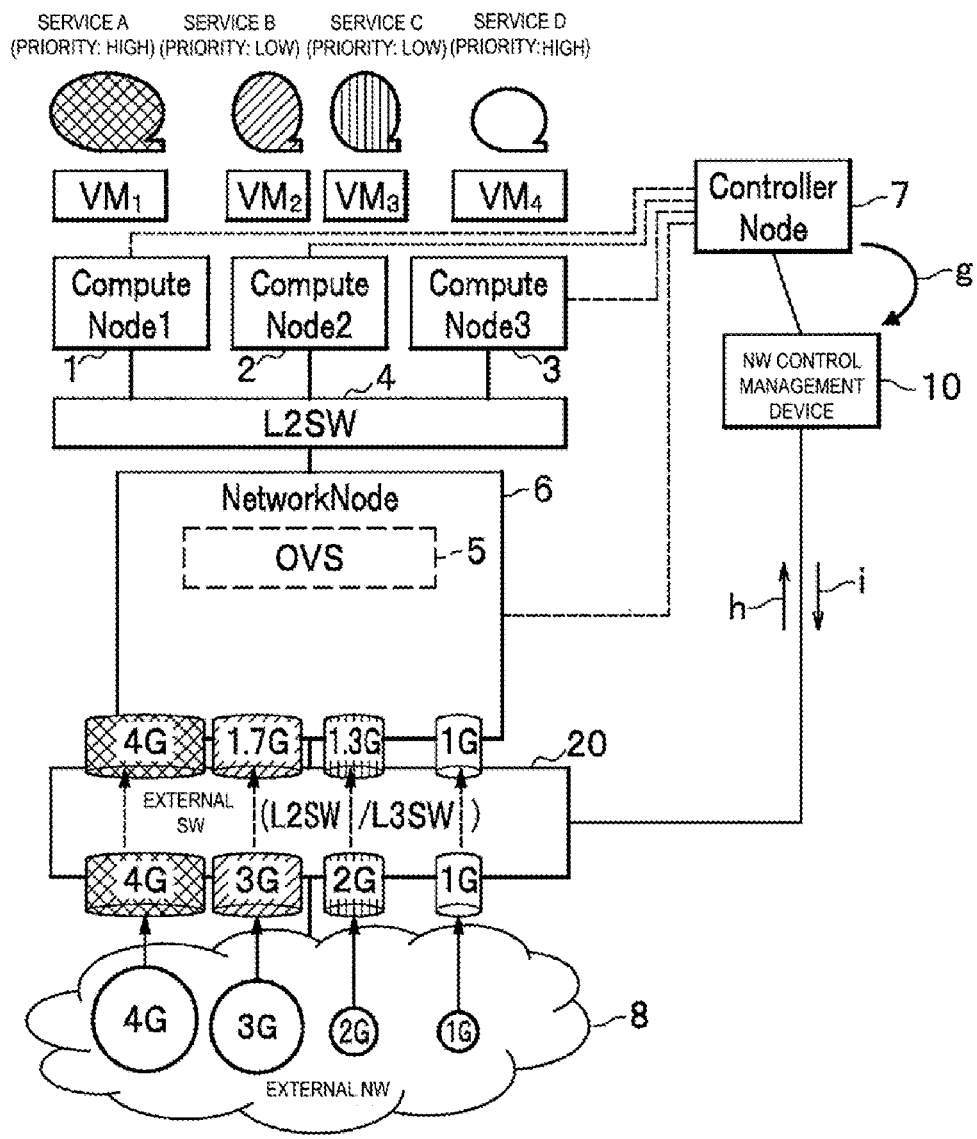
FIG. 5 is a diagram illustrating an operational example 1 of the network system according to the present embodiment in operation.

FIG. 5 is a diagram illustrating an operational example 1 in operation.

In the example of FIG. 5, the bandwidth upper limits are configured to 4 Gbps, 3 Gbps, 2 Gbps, and 1 Gbps for a service A (priority: high), a service B (priority: low), a service C (priority: low), and a service D (priority: high), respectively.

The NW control management device 10 (see FIG. 2) executes the following steps in operation.

Step S11: traffic information collection from ceilometer etc.

The NW usage situation check unit 121 (see FIG. 2) of the NW control unit 120 periodically checks the function of managing the NW bandwidth by the ceilometer or the like for the usage situation of the NW bandwidth. The situation reception unit 122 receives a situation acquired from the function of managing the NW bandwidth by the ceilometer or the like (see, reference symbol g of FIG. 5).

Step S12: Traffic Collection from External SW 20

The NW usage situation check unit 121 (see FIG. 2) of the NW control unit 120 periodically checks the external SW 20 for the traffic information. The situation reception unit 122 receives the traffic information from the external SW 20 (see, reference symbol h of FIG. 5).

In this manner, the NW control unit 120 periodically acquires the traffic information by using a function of acquiring the NW information from the ceilometer or the like and the external SW 20 provided on the virtualization platform. The NW control unit 120 identifies the bandwidth amount processable by the OVS of the virtualization platform, and has an upper limit thereof.

Step S13: Detection of OVS Over-Throughput and Generation of Config Information

In a case where each service does not exceed the upper limit bandwidth configured for each service and the upper limit of the throughput of the OVS is exceeded, packet loss occurs. To avoid the packet loss, the NW control management device 10 creates the Config information such that the bandwidth is secured for the service with high priority and the bandwidth is reduced for the service with low priority in consideration of the priority of each service before each service exceeds the upper limit.

Specifically, the available bandwidth amount calculation unit 123 (see FIG. 2) of the NW control unit 120 calculates the available bandwidth amount from the acquired usage bandwidth amount.

The bandwidth amount comparison and allocatable bandwidth calculation unit 124 (see FIG. 2) compares the bandwidth information of the data management functional unit 114 with the aforementioned available bandwidth amount, and decides the bandwidth amount to be allocated to each service.

In the example of FIG. 5, the bandwidths are secured for the service A and the service D with high priority (the bandwidth is not changed for the service A at 4 Gbps and the service D at 1 Gbps), and the bandwidths are reduced for the service B and the service C, both of which are of low priority (the upper limit bandwidth is reduced to 1.7 Gbps from 3 Gbps for the service B and is reduced to 1.3 Gbps from 2 Gbps for the service C).

Step S14: Configuration Modification

The bandwidth amount comparison and allocatable bandwidth calculation unit 124 of the NW control unit 120 transfers the configuration information to the external SW 20 (see, reference symbol i of FIG. 5), and updates the DB of the data management storage unit 114.

The external SW configuration information generation unit 131 (see FIG. 2) of the external SW configuration unit 130 configures the configuration information of the external SW 20 based on the generated Config information.

The external SW connection and configuration unit 132 (see FIG. 2) of the external SW configuration unit 130 is connected to the external SW 20 to perform the Config input.

With the aforementioned operations, the services are controlled such that the upper limit bandwidths of the services with high priority are maintained and the upper limit bandwidths of the services with low priority are reduced as illustrated in FIG. 5.

In the external NW 8, the packet flows into the virtualization platform in descending order of services with high priority, and thus, service interruption of the services with high priority can be avoided.

Operational Example 2 in Operation

Figure 6:
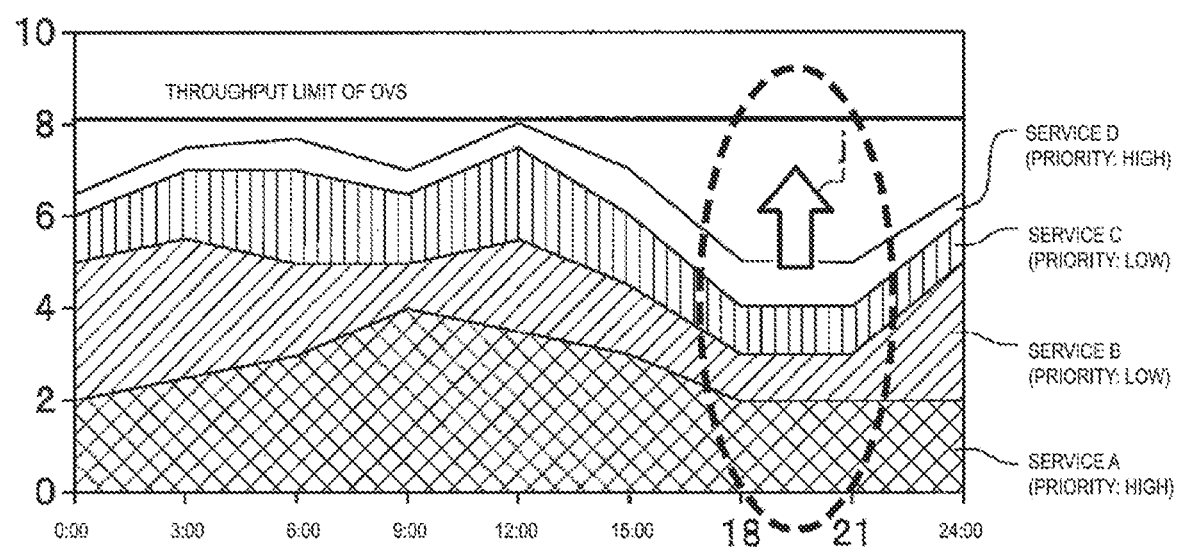
FIG. 6 is a graph representing a traffic volume of daily trends of the network system according to the present embodiment.

FIG. 6 is a graph representing the traffic volume of daily trends. The trends of the traffic volume in a time zone from 0:00 to 24:00 are represented on a horizontal axis, and the bandwidths used for the services are illustrated stacked on a vertical axis. The hatching pattern for each stack in the figures corresponds to the legend of each service in FIGS. 4 and 5.

As represented in FIG. 6, it is assumed that a throughput limit of the OVS 5 is 8 Gbps. In the daily trends represented in FIG. 6, the throughput of the OVS 5 does not exceed the limit even in any time zone from 0:00 to 24:00. In the case of the time zone indicated by a dashed oval box (from 18:00 to 21:00) of FIG. 6, there is an available bandwidth of about 3 Gbps with respect to 8 Gbps which is the throughput limit of the OVS 5. Thus, the upper limit bandwidth of the service D (priority: high, 1 Gbps) indicated by an arrow j of FIG. 6 can be increased to 3 Gbps temporarily. In this manner, the improved service can be provided to the service D with high priority.

Figure 7:
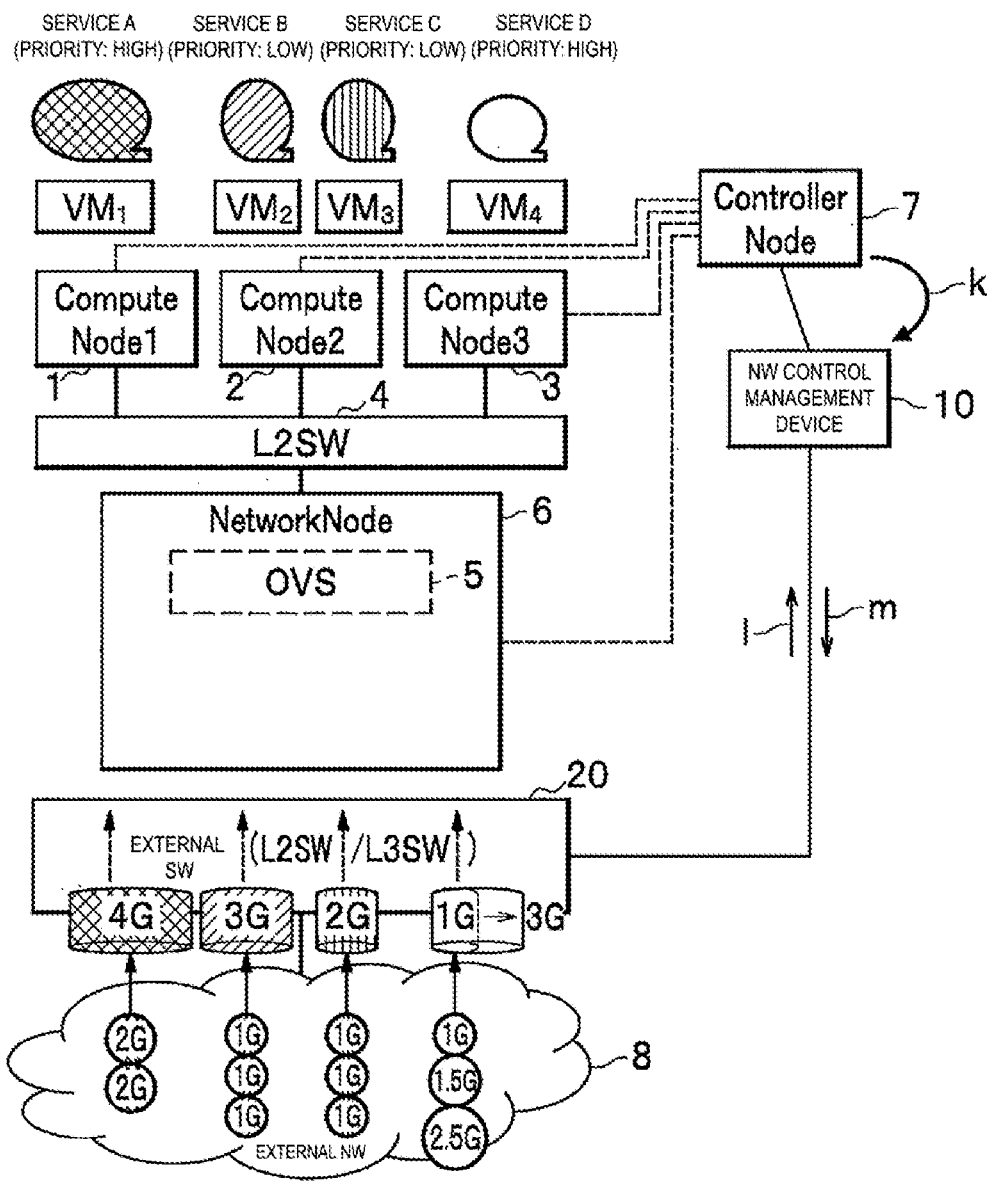
FIG. 7 is a diagram illustrating an operational example 2 of the network system according to the present embodiment in operation.

FIG. 7 is a diagram illustrating the operational example 2 in operation. This operation example is an example in which the traffic volume of the trends of FIG. 6 is identified and the identified traffic volume is applied to the operation.

In the example of FIG. 7, the bandwidth upper limits are configured to 4 Gbps, 3 Gbps, 2 Gbps, and 1 Gbps for a service A (priority: high), a service B (priority: low), a service C (priority: low), and a service D (priority: high) as in FIG. 6, respectively.

Step S21: Traffic Information Collection from Ceilometer Etc.

The NW usage situation check unit 121 (see FIG. 2) of the NW control unit 120 periodically checks the function of managing the NW bandwidth by the ceilometer or the like for the usage situation of the NW bandwidth. The situation reception unit 122 receives the situation acquired from the function of managing the NW bandwidth by the ceilometer or the like (see, reference symbol k of FIG. 7).

Step S22: Traffic Collection from External SW 20

The NW usage situation check unit 121 (see FIG. 2) of the NW control unit 120 periodically checks the external SW 20 for the traffic information. The situation reception unit 122 receives the traffic information from the external SW 20 (see, reference symbol l of FIG. 7).

In this manner, the NW control unit 120 periodically acquires the traffic information by using a function of acquiring the NW information from the ceilometer or the like and the external SW 20 provided on the virtualization platform. The NW control unit 120 identifies the bandwidth amount processable by the OVS of the virtualization platform, and has an upper limit thereof.

Step S23: Detection that there is Room in NW and Generation of Config Information When there is room in the NW bandwidth of the entire virtualization platform as in the time zone indicated by the dashed oval box (from 18:00 to 21:00) of FIG. 6, the Config information for temporarily changing the upper limit bandwidth of the service D (priority: high) from 1 Gbps to 3 Gbps is created.

The NW control management device 10 is connected to the external SW 20 to modify the configuration of the external SW 20 according to the created Config information.

Step S24: Configuration Modification

The bandwidth amount comparison and allocatable bandwidth calculation unit 124 of the NW control unit 120 transfers the configuration information to the external SW 20 (see, reference symbol m of FIG. 7), and updates the information of the data management storage unit 114. The external SW configuration information generation unit 131 (see FIG. 2) of the external SW configuration unit 130 configures the configuration information of the external SW 20 based on the generated Config information.

With the aforementioned operations, in a case where there is room in the NW of the virtualization platform, the bandwidth is temporarily allocated to the service of which the bandwidth exceeds the upper limit bandwidth, and thus, the NW is effectively utilized.

Operational Example 3 in Operation

Figure 8:
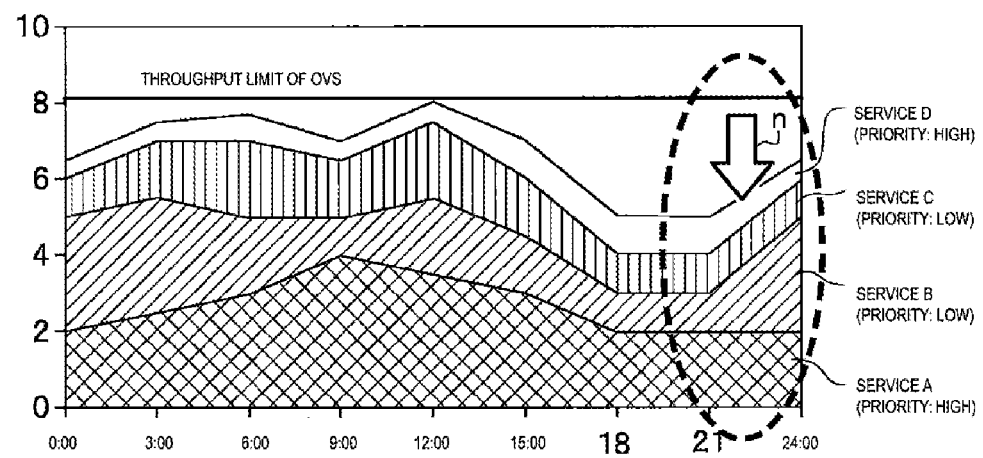
FIG. 8 is a graph representing a traffic volume of daily trends of the network system according to the present embodiment.

FIG. 8 is a graph representing the traffic volume of the identical daily trends as those of FIG. 6. The trends of the traffic volume in a time zone from 0:00 to 24:00 are represented on a horizontal axis, and the bandwidths used for the services are illustrated stacked on a vertical axis. In the time zone indicated by a dashed oval box (from 21:00 to 24:00) of FIG. 8, the available bandwidth of about 3 Gbps present in the time zone (from 18:00 to 21:00) tends to decrease. Thus, as indicated by an arrow n of FIG. 8, control for restoring the upper limit bandwidth of the service D (priority: high, 1 Gbps) that has been increased temporarily to the original upper limit bandwidth is performed.

Figure 9:
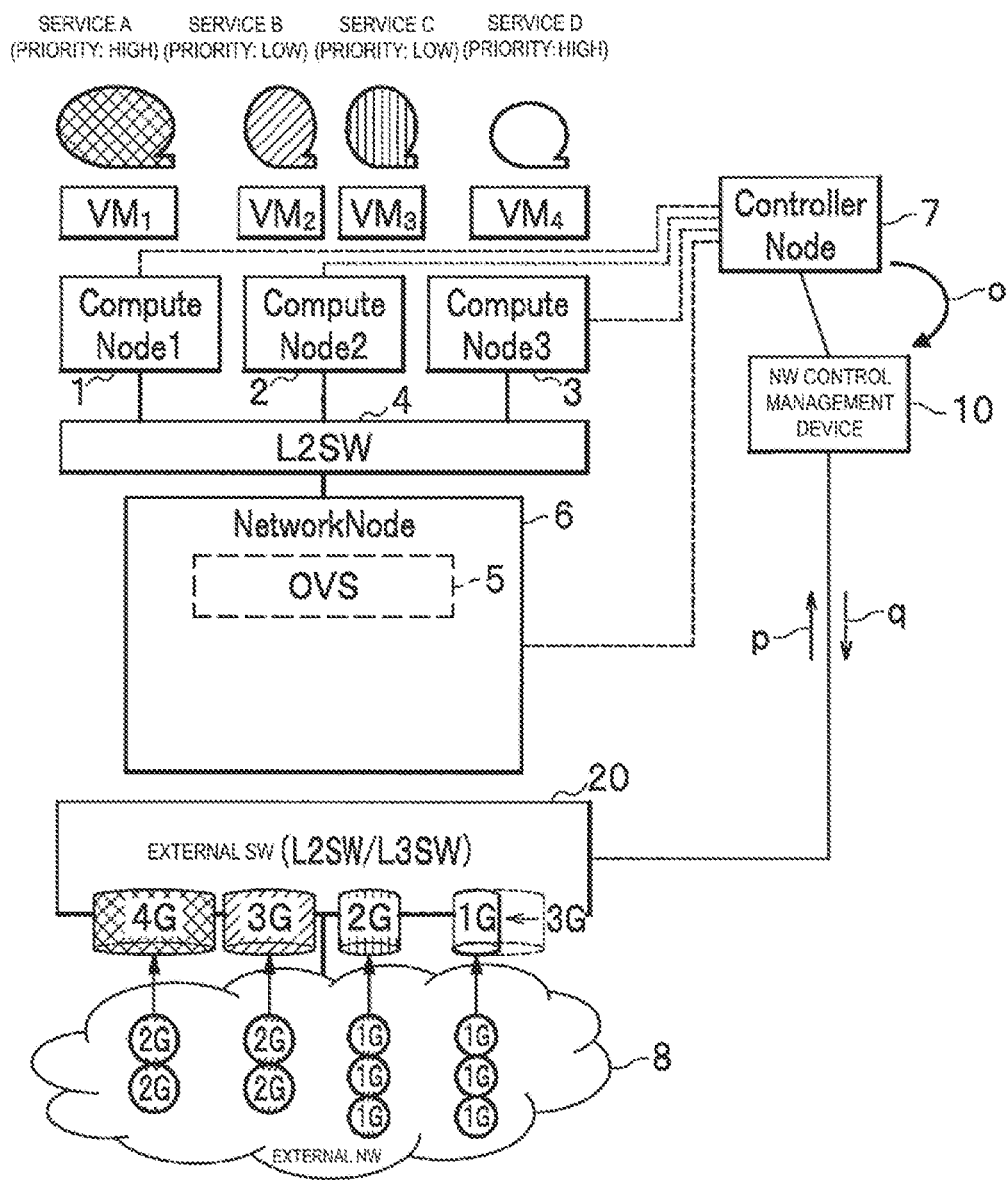
FIG. 9 is a diagram illustrating an operational example 3 of the network system according to the present embodiment in operation.

FIG. 9 is a diagram illustrating the operational example 3 in operation. This operational example is an example in which the traffic volume of the trends of FIG. 8 is identified and the upper limit bandwidth of the service that has been increased temporarily is restored to the original upper limit bandwidth.

In the example of FIG. 9, the service D (priority: high) has been configured to 3 Gbps temporarily.

Step S31: Traffic Information Collection by Ceilometer Etc.

The NW usage situation check unit 121 (see FIG. 2) of the NW control unit 120 periodically checks, to the function of managing the NW bandwidth by the ceilometer or the like, the usage situation of the NW bandwidth. The situation reception unit 122 receives a situation obtained from a function managing the NW bandwidth by a ceilometer or the like (see reference sign o in FIG. 9).

Step S32: Traffic Collection from External SW 20

The NW usage situation check unit 121 (see FIG. 2) of the NW control unit 120 periodically checks the external SW 20 for the traffic information. The situation reception unit 122 receives the traffic information from the external SW 20 (see, reference symbol p of FIG. 9).

Step S33: Detection that there is No Room in NW and Generation of Config Information When the available bandwidth of the NW bandwidth of the entire virtualization platform tends to decrease as in the time zone indicated by the dashed oval box (from 21:00 to 24:00) of FIG. 8, the Config information for changing the upper limit bandwidth of the service D (priority: high) that has been increased temporarily from 3 Gbps to 3 Gbps, which is the original upper limit bandwidth, is created.

The NW control management device 10 is connected to the external SW 20 to modify the configuration of the external SW 20 according to the created Config information.

Step S34: Configuration Modification

The bandwidth amount comparison and allocatable bandwidth calculation unit 124 of the NW control unit 120 transfers the configuration information to the external SW 20 (see, reference symbol q of FIG. 9), and updates the information of the data management storage unit 114.

The external SW configuration information generation unit 131 (see FIG. 2) of the external SW configuration unit 130 configures the configuration information of the external SW 20 based on the generated Config information.

With the aforementioned operations, the upper limit bandwidth that has been allocated temporarily to the service, of which the bandwidth exceeds the upper limit bandwidth when there has been room in the NW of the virtualization platform, is restored to the original upper limit bandwidth, and thus, the upper limit bandwidth can be reliably maintained within the throughput limit of the OVS 5. Even though the temporal upper limit bandwidth has been allocated temporarily to the service of which the bandwidth exceeds the upper limit bandwidth, the throughput can be maintained within the throughput limit of the OVS 5, and thus, the NW of the virtualization platform can be effectively utilized.

Operational Example 4 in Operation

Figure 10:
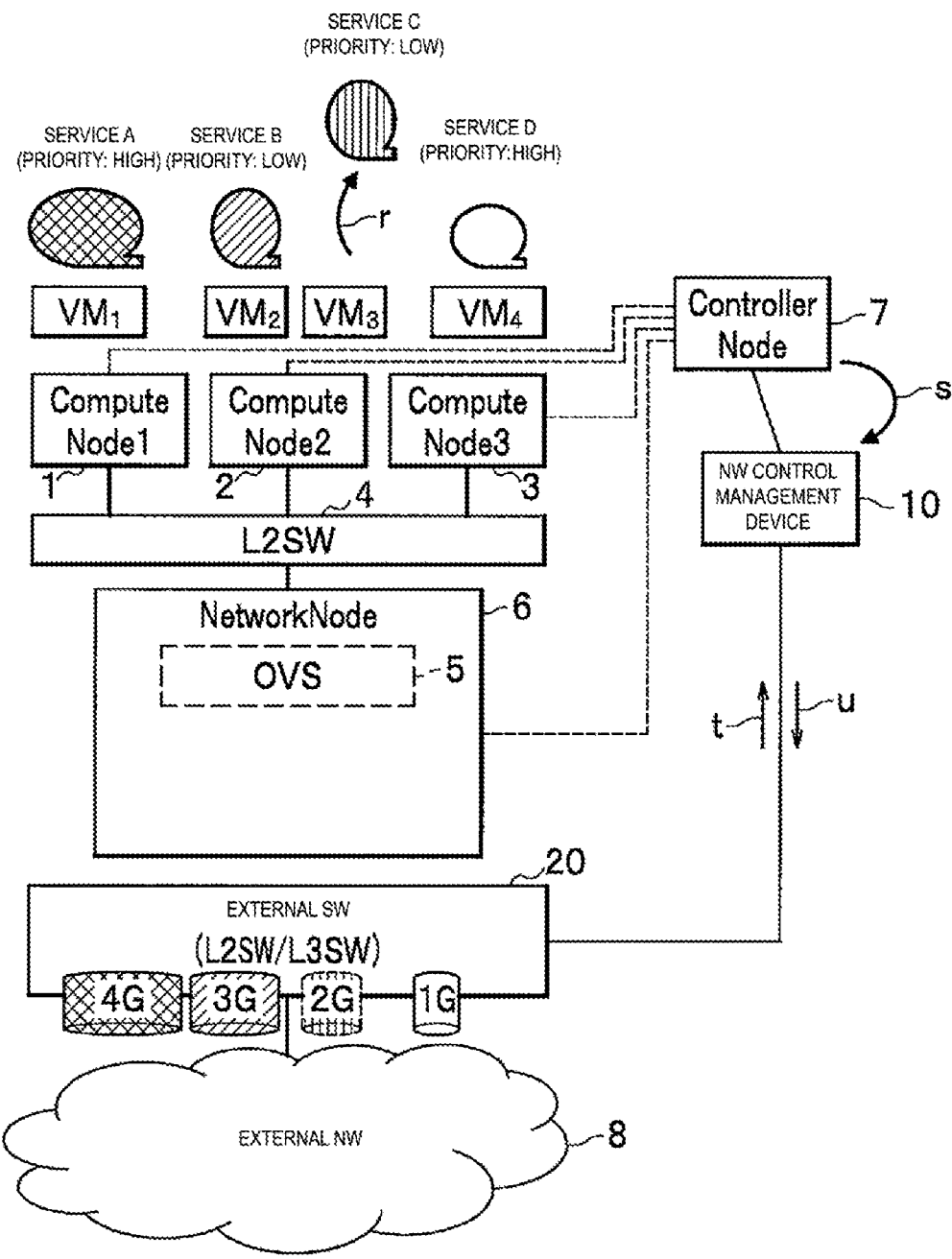
FIG. 10 is a diagram illustrating an operational example 4 of the network system according to the present embodiment in operation.

FIG. 10 is a diagram illustrating an operational example 4 in operation, and illustrates an example of a case of service deletion.

In the example of FIG. 10, the bandwidth upper limits are configured to 4 Gbps, 3 Gbps, 2 Gbps, and 1 Gbps for a service A (priority: high), a service B (priority: low), a service C (priority: low), and a service D (priority: high), respectively. At this time, an example in which the service C (priority: low) is deleted is illustrated (see, reference symbol r of FIG. 10).

Step S41: Traffic Information Collection by Ceilometer Etc.

The NW usage situation check unit 121 (see FIG. 2) of the NW control unit 120 periodically checks the function of managing the NW bandwidth by the ceilometer or the like for the usage situation of the NW bandwidth. The situation reception unit 122 receives the situation acquired from the function of managing the NW bandwidth by the ceilometer or the like (see, reference symbol s of FIG. 9).

The NW usage situation check unit 121 identifies the information on the service deleted from the controller in response to the deletion of the service from the NW of the virtualization platform.

Step S42: Traffic Collection from External SW 20

The NW usage situation check unit 121 (see FIG. 2) of the NW control unit 120 periodically checks the external SW 20 for the traffic information. The situation reception unit 122 receives the traffic information from the external SW 20 (see, reference symbol t of FIG. 9).

Step S43: Identification of Deleted Service and Generation of Config Information The NW usage situation check unit 121 identifies the information on the service deleted from the controller in response to the deletion of the service from the NW of the virtualization platform.

The NW control unit 120 (see FIG. 2) generates Config information for deleting the information regarding the NW such as a VLAN related to the deleted service.

Step S44: Configuration Modification

The bandwidth amount comparison and allocatable bandwidth calculation unit 124 of the NW control unit 120 transfers the configuration information to the external SW 20 (see, reference symbol u of FIG. 9), and updates the information of the data management storage unit 114.

The external SW configuration information generation unit 131 (see FIG. 2) of the external SW configuration unit 130 configures the configuration information of the external SW 20 based on the generated Config information.

Step S45: Deletion from DB

The data management unit 110 (see FIG. 2) deletes the information on the deleted service from the DB of the data management storage unit 114.

Example of Assumed Pattern of Bandwidth Control

An example of a possible pattern of the bandwidth control will be described with reference to FIGS. 11 to 14.

Pattern Example 1

Figure 11:
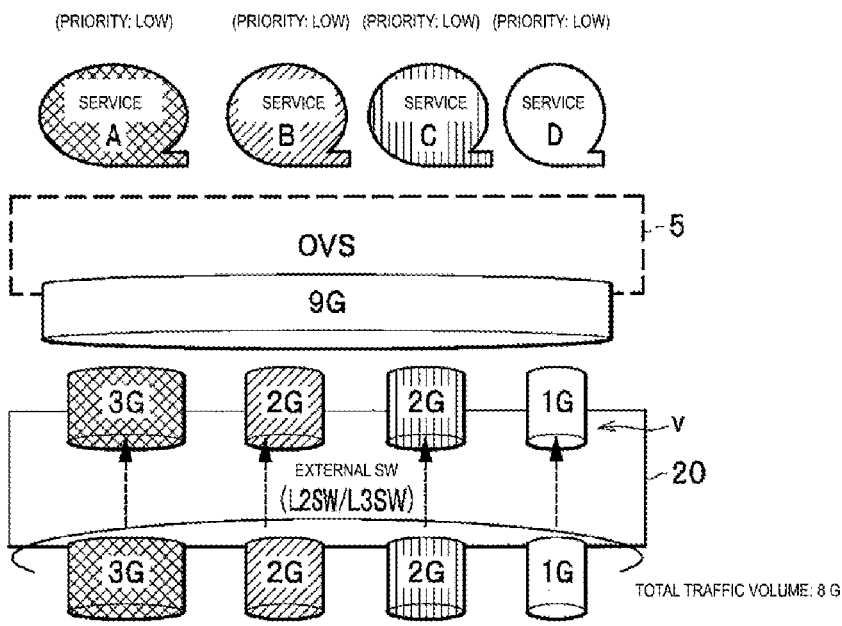
FIG. 11 is a diagram illustrating a pattern example 1 when OVS throughput is equal to or greater than total traffic volume and priorities are identical (all high or low) in the network system according to the present embodiment.

FIG. 11 is an example of a case where OVS throughput is equal to or greater than the total traffic volume and the priorities are identical (all high or low).

In the example of FIG. 11, all priorities are identical for a service A (priority: low), a service B (priority: low), a service C (priority: low), and a service D (priority: low), and are "low". It is assumed that the throughput limit of the OVS 5 is 9 Gbps and the total traffic volume is 8 Gbps. When OVS throughput is equal to or greater than the total traffic volume and priorities are identical (all low), 8 Gbps which is the total upper limit inflow amount falls within 9 Gbps which is the throughput limit of the OVS 5, and there is no need for bandwidth change. When there is room in the NW bandwidth, it is also possible to equally increase the upper limit.

When OVS throughput is equal to or greater than the total traffic volume and priorities are identical (all high), 8 Gbps which is the total upper limit inflow amount falls within 9 Gbps which is the throughput limit of the OVS 5. There is room of 1 Gbps up to 9 Gbps which is the throughput limit of the OVS 5, but the order of the priorities are not given due to the identical priorities (all high). When there is room in the NW bandwidth, it is also possible to equally increase the upper limit.

Pattern Example 2

Figure 12:
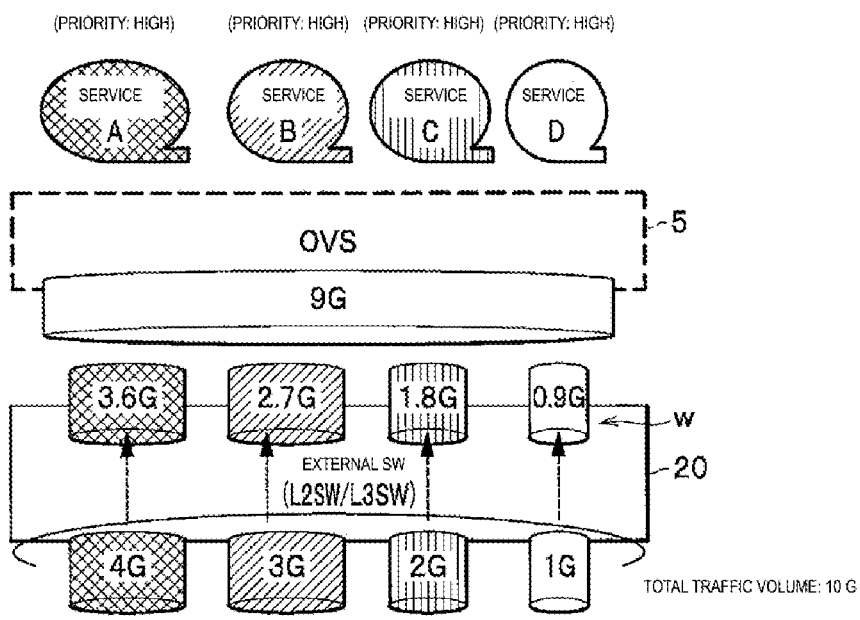
FIG. 12 is a diagram illustrating a pattern example 2 when OVS throughput is less than total traffic volume and priorities are identical (all high or low) in the network system according to the present embodiment.

FIG. 12 is an example of a case where OVS throughput is less than the total traffic volume and priorities are identical (all high or low).

In the example of FIG. 12, all priorities are identical for a service A (priority: high), a service B (priority: high), a service C (priority: high), and a service D (priority: high), and are "high". The throughput limit of the OVS 5 is 9 Gbps, and the total upper limit inflow amount is 10 Gbps. The total upper limit inflow amount exceeds 1 Gbps with respect to 9 Gbps which is the throughput of the OVS 5, but the priorities of the services are identical. In this case, the NW control unit 120 (see FIG. 2) obtains total traffic volume/OVS throughput x upper limit bandwidth of each service.

In the example of FIG. 12, the bandwidth upper limits are configured to 4 Gbps, 3 Gbps, 2 Gbps, and 1 Gbps for the service A (priority: high), the service B (priority: high), the service C (priority: high), and the service D (priority: high), respectively. However, each bandwidth upper limit configuration is equally reduced by 10%, and the bandwidth upper limits are configured to 3.6 Gbps, 2.7 Gbps, 1.8 Gbps, and 0.9 Gbps, respectively (see, reference symbol w of FIG. 12). Accordingly, 10% of packets are equally discarded or delayed.

The following pattern example 3 and pattern example 4 are examples in which the priorities of the services are not identical.

Pattern Example 3

Figure 13:
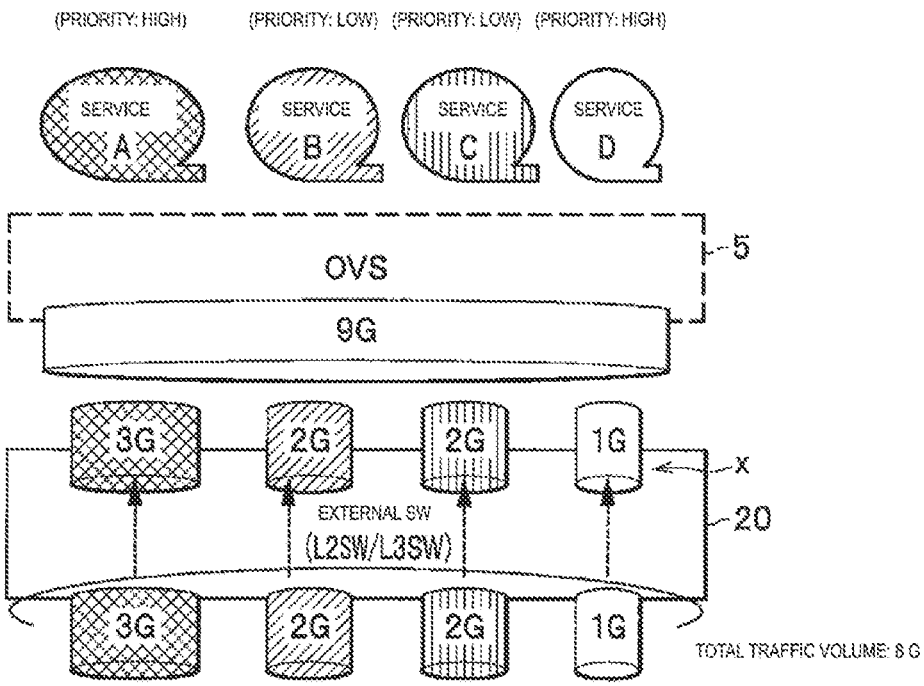
FIG. 13 is a diagram illustrating a pattern example 3 when OVS throughput is equal to or greater than total traffic volume and priorities are mixed in the network system according to the present embodiment.

FIG. 13 is an example of a case where OVS throughput is equal to or greater than the total traffic volume and priorities are mixed.

In the example of FIG. 13, there are a service A (priority: high), a service B (priority: low), a service C (priority: low), and a service D (priority: high). The throughput limit of the OVS 5 is 9 Gbps, and the total traffic volume is 8 Gbps.

As illustrated in FIG. 13, when OVS throughput is equal to or greater than the total traffic volume and priorities are mixed, 8 Gbps which is the total traffic volume falls within 9 Gbps which is the throughput limit of the OVS 5, and thus, there is no bandwidth change (see, reference symbol x of FIG. 13).

In this manner, when OVS throughput is equal to or greater than the total traffic volume and priorities are mixed, there is no bandwidth change, and these upper limit bandwidths are used as the upper limit bandwidth of the services.

Pattern Example 4

Figure 14:
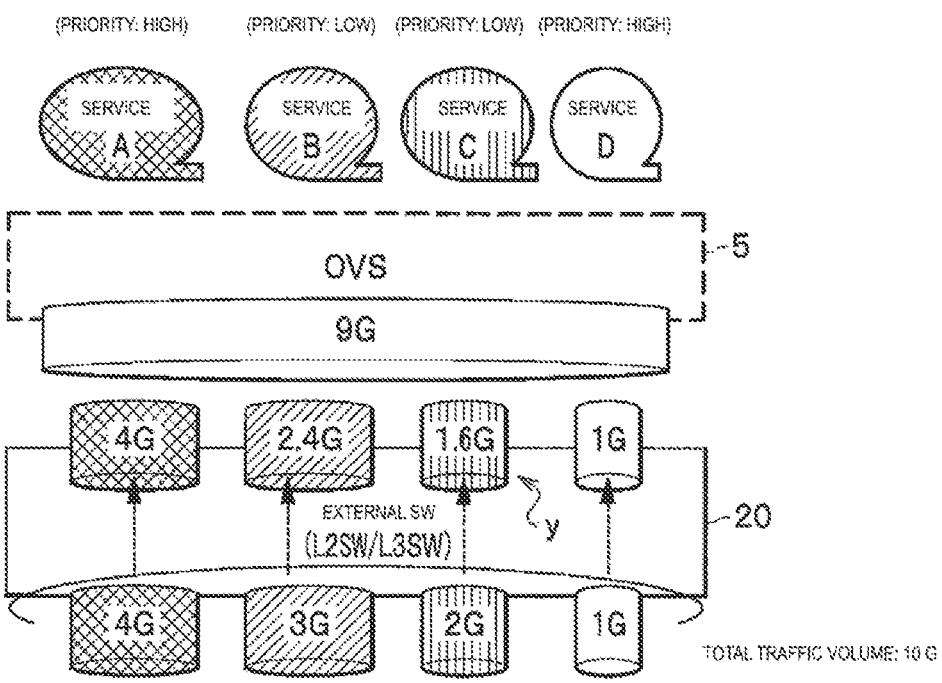
FIG. 14 is a diagram illustrating a pattern example 4 when OVS throughput is less than total traffic volume and priorities are mixed in the network system according to the present embodiment.

FIG. 14 is an example of a case where OVS throughput is less than the total traffic volume and priorities are mixed.

In the example of FIG. 14, there are a service A (priority: high), a service B (priority: low), a service C (priority: low), and a service D (priority: high). The throughput limit of the OVS 5 is 9 Gbps, and the total traffic volume is 10 Gbps.

When OVS throughput is less than the total traffic volume and priorities are mixed, the bandwidth upper limit configuration is not reduced for the service with high priority, and the bandwidth upper limit configuration is reduced for the service with low priority. In this case, the bandwidth is not modified for the service with high priority, and the bandwidth obtained by (total inflow amount of "low")/(remaining OVS throughput)×(upper limit bandwidth of each service) is used for the service with low priority.

In the example of FIG. 14, the bandwidth upper limits are configured to 4 Gbps, 3 Gbps, 2 Gbps, and 1 Gbps for the service A (priority: high), the service B (priority: low), the service C (priority: low), and the service D (priority: high). The bandwidth is not modified for the service with high priority, and the bandwidth upper limit is reduced for the service with low priority as will be described below.

The bandwidth allocatable to the service with priority "low" is 9−(4+1)=4 Gbps obtained by subtracting the bandwidths of the services with priority "high" from 9 Gbps which is the throughput of the OVS 5. Thus, the NW control unit 120 (see FIG. 2) equally reduces 3 Gbps and 2 Gbps which are the bandwidth upper limit configuration of the service B (priority: low) and the service C (priority: low) by 20%, and configures 2.4 Gbps and 1.6 Gbps as the bandwidth upper limit configurations, respectively (see, reference symbol y of FIG. 14). Accordingly, 20% of packets are equally discarded or delayed for the bandwidth allocatable to the service with priority "low".

As described above, the network system 100 includes the external SW 20 that is provided between the virtualization platform and the external NW 20 and configured to control a bandwidth amount of packets flowing into the OVS 5, and the NW control management device 10 that is configured to modify a configuration of bandwidth control and priority control of the external SW 20 in response to addition or deletion of the service of the virtualization platform based on information acquired from the compute nodes 1 to 3, the network node 6, and the controller node 7.

The NW control management device 10 includes the data management unit 110 configured to acquire information on the VM from the controller node 7 and to manage information regarding the NW control including an ID, an IP address, a MAC address, a VLAN, and a bandwidth of each service: the NW control unit 120 configured to collect information from the ceilometer provided on the virtualization platform, to monitor the NW bandwidth amount of the external SW 20, and to release or configure the bandwidth limitation corresponding to the usage amount of each VM when the upper limit of the bandwidth is not configured or when there is the available bandwidth; and the external SW configuration unit 130 that is configured to generate Config information for configuring the bandwidth amount to be allocated to each service on the external SW 20, and is configured to be connected to the external SW 20 to input Config information.

In the NW control management device 10, modifying the configuration of the bandwidth control and the priority control of the external SW 20 in response to the addition or deletion of the service of the virtualization platform based on the information acquired from the compute nodes 1 to 3, the network node 6, and the controller node 7 is executed. In the external SW 20, controlling the bandwidth amount of the packets flowing into the OVS 5 is executed.

Figure 16:
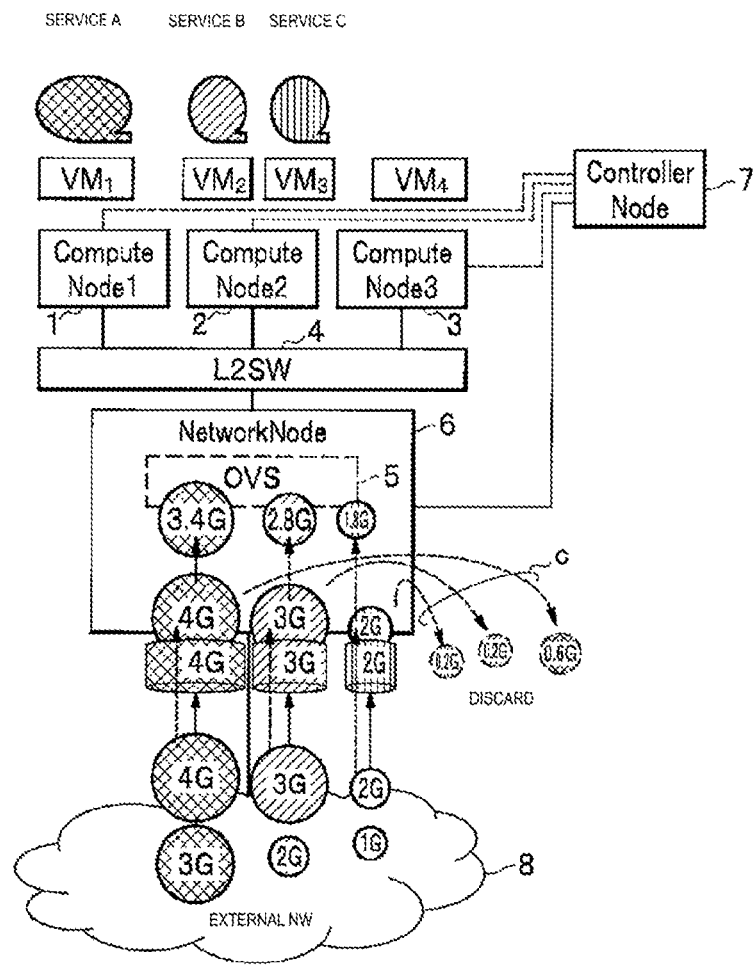
FIG. 16 is a diagram for describing network bandwidth control in the virtualization platform of the related art.

In the related art (see FIGS. 15 and 16), in particular, when a large number of packets flow from the external SW 20, from the perspective of the entire virtualization platform, packets of the individual service, for which the bandwidth does not exceed, flow into the OVS 5, increasing a processing load of the OVS 5, and creating a congestion. That is, the packet loss occurs even though each service is equal to or less than the configured upper limit of the bandwidth. The packets are discarded even if the packets that needs to be prioritized flow form the external NW. This causes delay due to communication interruption or packet retransmission of the service installed on the virtualization platform occurs. Even with a service with high priority such as phone calls, the packet may be discarded, and thus, the service may not be established.

In contrast, in the present embodiment, the configuration of the bandwidth control and the priority control of the external SW 20 in response to the addition or deletion of the service of the virtualization platform is modified by using the ID information and the MAC address information or the VLAN information and the IP address information of the VM within the controller node 7 of the virtualization platform. Accordingly, the congestion in the OVS 5 on the virtualization platform can be eliminated, and the packet to be prioritized can be processed. It is possible to prevent packets that need to preferentially flow from being discarded at a time of high load.

The usage bandwidth is modified depending on the usage situation of the NW of the virtualization platform, and thus, the NW can be effectively utilized.

In the present embodiment, the bandwidth control is automatically configured. That is, in the related art, an operator needs to design the bandwidth in consideration of the bandwidth of the full service (VM) in a method of manually configuring the bandwidth control by the operator. The design needs to be reviewed and reconfigured whenever the service is added or deleted. In contrast, in the present embodiment, the usage bandwidth can be automatically modified while eliminating design reviews by the operator, and thus, the NW can be effectively utilized.

In the present embodiment, the NW control management device 10 is configured to generate the Config information for configuring the information regarding the NW including the VLAN, the upper limit bandwidth, and the priority which are related to the service, on the external SW 20 based on the acquired information, and the NW control management device 10 is configured to be connected to the external SW 20, and to modify the configuration of the external SW 20 according to the created Config information. Accordingly, the NW control management device 10 can modify the configuration of the bandwidth control and the priority control in accordance with the external SW 20.

In the present embodiment, the NW control management device 10 includes the data storage unit 114 that is configured to identify the bandwidth amount processable by the OVS 5 of the virtualization platform and to store the upper limit thereof. Furthermore, the NW control management device 10 is configured to collect the information from the ceilometer provided on the virtualization platform, to monitor the NW bandwidth of the external SW 20, and to acquire the traffic information of each service periodically. The NW control management device 10 is configured to generate the Config information such that the bandwidth is secured for the service with high priority and the bandwidth is reduced for the service with low priority before each service does not exceed the upper limit bandwidth configured for each service and the upper limit of the throughput of the OVS 5 is exceeded. Thus, the status of the NW usage of the virtualization platform is monitored, and the bandwidth control can be automatically modified in response to the service available up to the bandwidth upper limit and an status of the NW availability of the virtualization platform. Accordingly, the NW of the virtualization platform can be effectively utilized. In particular, in the external NW 8, the packet flows into the virtualization platform in descending order of services with high priority, and thus, service interruption of the services with high priority can be avoided.

In the present embodiment, the NW control management device 10 is configured to identify the trends of time, month, day, or day of the week when a traffic volume of each service is the greatest or is small, and to create the Config information that temporarily modifies the upper limit bandwidth of the service when the service tends to exceed the upper limit bandwidth and there is room in the NW bandwidth of the overall virtualization platform. Thus, the function of automatic modification of the bandwidth upper limit of the bandwidth control of the virtualization platform and the external SW 20 temporarily is provided, and the NW of the virtualization platform can be effectively utilized.

In addition, among processes described in the embodiment, all or some processes described as being performed automatically can be manually performed, or all or some processes described as being performed manually can be performed automatically by the well-known method. In addition, information including the processing procedures, the control procedures, the specific names, and the various types of data, and various parameters described in the aforementioned document and drawings can be modified as desired except in the case specifically noted.

Each component of each apparatus illustrated is a functional concept, and does not necessarily need to be physically configured as illustrated. That is, the specific form of distribution and integration of the apparatus is not limited to the illustrated form, and the entirety or a portion of the form can be configured by being functionally or physically distributed and integrated in any unit, depending on various loads, usage conditions, and the like.

Some or all of the configurations, the functions, the processing units, the processing mechanisms, and the like may be realized in hardware by being designed, for example, in an integrated circuit. Each of the configurations, the functions, and the like may be realized in software for a processor to interpret and execute a program that implements the functions. Information such as programs, tables, files, and the like, which are for implementing the functions can be held in a recording device such as a memory, a hard disk, and a Solid State Drive (SSD), or a recording medium such as an Integrated Circuit (IC) card, a Secure Digital (SD) card, and an optical disk. In the present specification, the processes describing the time sequential processes include parallel or individually performed processes (for example, parallel processing or object processing) without necessarily being processed sequentially, in addition to processing performed sequentially in described order.

REFERENCE SIGNS LIST

1 to 3: compute node
4: L2 switch L2SW (L2SW)
5: OVS
6: Network node
7: Controller node
10: NW control management device
20: External SW
100: Network system
110: Data management unit
111: Data update check unit
112: Data reception unit
113: Data comparison and data update unit
114: Data management storage unit
120: NW control unit
121: NW usage situation check unit
122: Situation reception unit
123: Available bandwidth amount calculation unit
124: Bandwidth amount comparison and allocatable bandwidth calculation unit
130: External SW configuration unit
131: External SW configuration information generation unit
132: External SW connection and configuration unit
$VM_1$ to $VM_4$: Virtual machine

The invention claimed is:

1. A network system, in which a plurality of services are installed on a virtualization platform and a component constituting OpenStack connected to an open virtual switch (OVS) is included, the OVS being configured to discard packets when the packets flowing from an external network (NW) exceed an upper limit of a bandwidth configured for each service, the network system comprising:
an external switch (SW) that is provided between the virtualization platform and the external NW and configured to control a bandwidth amount of packets flowing to the OVS; and
an NW control management device configured to modify a configuration of bandwidth control and priority control of the external SW in response to addition or deletion of the service of the virtualization platform based on information acquired from the component, wherein
the NW control management device includes a data storage medium configured to identify a bandwidth amount that is processable by the OVS of the virtualization platform, and to store an upper limit of the bandwidth amount,
the NW control management device is configured to collect information from a ceilometer provided on the virtualization platform, to monitor an NW bandwidth amount of the external SW, and to acquire traffic information of each service periodically, and
the NW control management device is configured to generate configuration information such that a bandwidth is secured for a service with high priority and an upper limit bandwidth is reduced for a service with low priority before each service does not exceed an upper limit bandwidth configured for each service and an upper limit of a throughput of the OVS is exceeded.

2. The network system according to claim 1,
wherein the NW control management device is configured to generate configuration information for configuring information regarding an NW including a virtual LAN (VLAN), an upper limit bandwidth, and priority which are related to the service on the external SW, based on the acquired information, and
the NW control management device is configured to be connected to the external SW, and to modify the configuration of the external SW according to the generated configuration information.

3. The network system according to claim 1,
wherein the NW control management device includes:
a data management unit, including one or more processors, configured to acquire information on a virtual machine (VM) from a controller node constituting the component, and manage information regarding NW control including an ID, an IP address, a MAC address, a VLAN, and a bandwidth of each service;
an NW control unit, including one or more processors, configured to collect information from a ceilometer provided on the virtualization platform, to monitor an NW bandwidth amount of the external SW, and to release or configure a bandwidth limit corresponding to a usage amount of each VM when the upper limit of the bandwidth is not configured or when there is an available bandwidth; and
an external SW configuration unit, including one or more processors, that is configured to generate configuration information for configuring a bandwidth amount to be allocated to each service on the external SW, and is configured to be connected to the external SW to input the configuration information.

4. The network system according to claim 1,
wherein the NW control management device is configured to
identify a time, month, day, or day of a week when a traffic volume of each service is the greatest or is small, and
the NW control management device is configured to create configuration information to temporarily increase the upper limit bandwidth of the service when the service tends to exceed the upper limit bandwidth and there is room in the NW bandwidth of the entire virtualization platform.

5. A network bandwidth control management method,
in which a plurality of services are installed on a virtualization platform and a component constituting OpenStack connected to an open virtual switch (OVS) is included, the OVS being configured to perform policing of packets when the packets flowing from an external NW exceed an upper limit of a bandwidth configured for each service,
the network bandwidth control management method comprising:
changing a configuration of bandwidth control and priority control of an external SW in response to addition or deletion of the service of the virtualization platform based on information acquired from the component in an NW control management device that controls NW control, wherein the NW control management device includes a data storage medium configured to identify a bandwidth amount that is processable by the OVS of the virtualization platform, and to store an upper limit of the bandwidth amount,
wherein changing the configuration of bandwidth control and priority control of the external SW comprises:
collecting information from a ceilometer provided on the virtualization platform, to monitor an NW bandwidth amount of the external SW, and to acquire traffic information of each service periodically, and
generate configuration information such that a bandwidth is secured for a service with high priority and an upper limit bandwidth is reduced for a service with low priority before each service does not exceed an upper limit bandwidth configured for each service and an upper limit of a throughput of the OVS is exceeded, and
controlling a bandwidth amount of the packets flowing into the OVS in the external SW provided between the virtualization platform and the external NW.

6. The network bandwidth control management method according to claim 5,
wherein the NW control management device is configured to generate configuration information for configuring information regarding an NW including a virtual LAN (VLAN), an upper limit bandwidth, and priority which are related to the service on the external SW, based on the acquired information, and
the NW control management device is configured to be connected to the external SW, and to modify the configuration of the external SW according to the generated configuration information.

7. The network bandwidth control management method according to claim 5,
wherein the NW control management device includes:
a data management unit, including one or more processors, configured to acquire information on a virtual machine (VM) from a controller node constituting the component, and manage information regarding NW control including an ID, an IP address, a MAC address, a VLAN, and a bandwidth of each service;
an NW control unit, including one or more processors, configured to collect information from a ceilometer provided on the virtualization platform, to monitor an NW bandwidth amount of the external SW, and to release or configure a bandwidth limit corresponding to a usage amount of each VM when the upper limit of the bandwidth is not configured or when there is an available bandwidth; and
an external SW configuration unit, including one or more processors, that is configured to generate configuration information for configuring a bandwidth amount to be allocated to each service on the external SW, and is configured to be connected to the external SW to input the configuration information.

8. The network bandwidth control management method according to claim 5,
wherein the NW control management device is configured to
identify a time, month, day, or day of a week when a traffic volume of each service is the greatest or is small, and
the NW control management device is configured to create configuration information to temporarily increase the upper limit bandwidth of the service when the service tends to exceed the upper limit bandwidth and there is room in the NW bandwidth of the entire virtualization platform.

* * * * *